Figure 3:
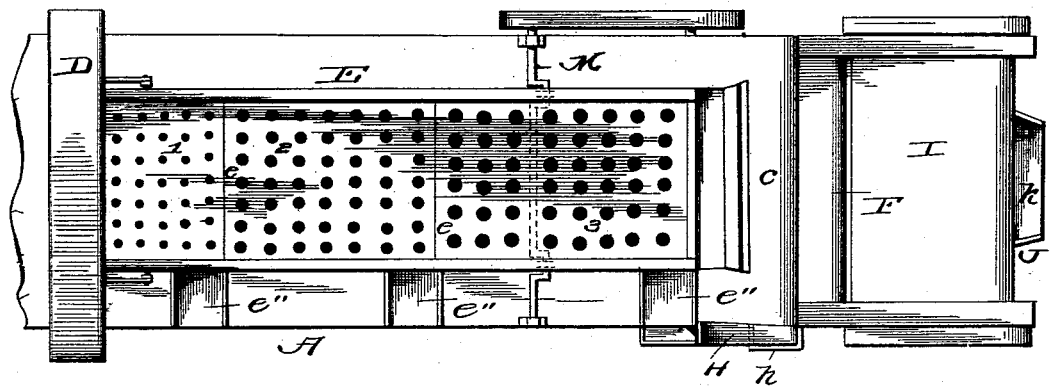

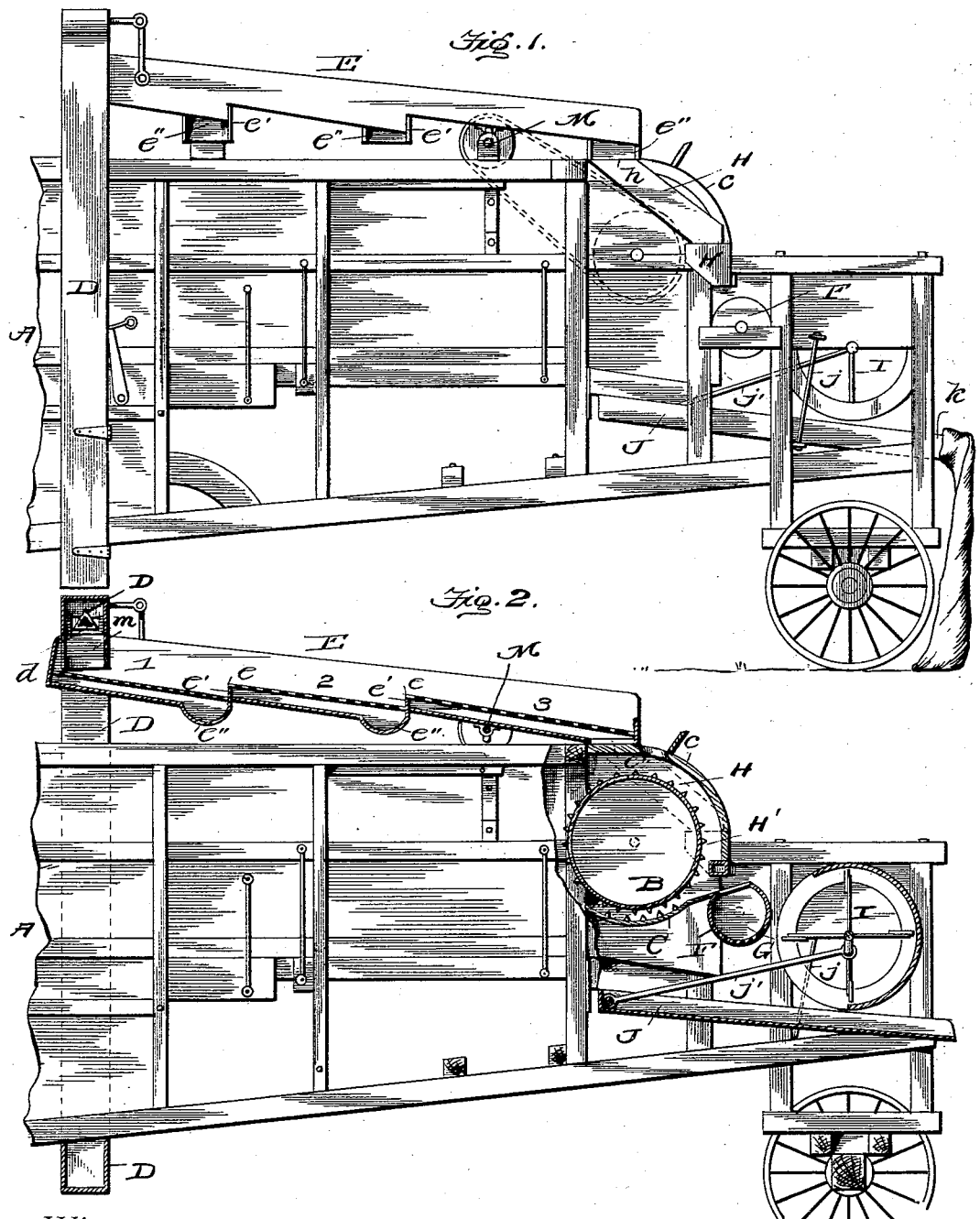

(No Model.) 2 Sheets—Sheet 2.

J. P. MONNETT.
RECLEANER FOR THRESHING MACHINES.

No. 572,086. Patented Nov. 24, 1896.

Witnesses:

Inventor.
John P. Monnett.
By Edson Bros,
Attorneys.

UNITED STATES PATENT OFFICE.

JOHN P. MONNETT, OF RENSSELAER, INDIANA.

RECLEANER FOR THRESHING-MACHINES.

SPECIFICATION forming part of Letters Patent No. 572,086, dated November 24, 1896.

Application filed January 25, 1894. Renewed April 29, 1896. Serial No. 589,605. (No model.)

*To all whom it may concern:*

Be it known that I, JOHN P. MONNETT, a citizen of the United States, residing at Rensselaer, in the county of Jasper and State of Indiana, have invented certain new and useful Improvements in Recleaners for Threshing-Machines; and I do hereby declare the following to be a full, clear, and exact description of the invention, such as will enable others skilled in the art to which it appertains to make and use the same.

This invention relates to improvements in recleaners for threshing-machines; and the object of the invention is to compactly dispose the parts comprising the recleaner in a manner to be out of the way of the wagons or stacks from which the grain is taken to be loaded on the machine and which also serves the purposes of a conveyer to deliver the recleaned seed to the sacking devices or to the final loading-elevator.

The recleaner of my invention is constructed with a special view to separating the timothy-seed and the "cheat," weed-seed, and shriveled grain from the heavy perfect kernels of the grain and to deliver the different grades of grain into separate chutes, from whence the various grades can be deposited in receptacles or bags.

It has been a long-felt want with grain-growers to have a machine which will properly separate the grain while it was being threshed from the timothy and other objectionable grades of grain, and with ordinary threshing-machines this has been accomplished by the use of a heavy blast of air from the fan of the primary cleaning-shoe; but it is obvious that the heavy blast of air blows all timothy, weed-seed, and shriveled grain into the straw as it is delivered or discharged from the rear end of the threshing-machine, which operation not only results in a direct loss of the timothy-seed, shriveled grain, and cheat, but a still great indirect loss to the farmer by having the obnoxious weed-seed and cheat finding their way with the straw into the manure hauled about the farm to enrich the soil. Again, all threshing-machines which take the grain to be threshed from wagons or stacks are provided with two large cumbersome elevators, one for carrying the tailings back to the cylinder for the purpose of rethreshing the same and one for carrying the grain from the delivery-spout of the primary shoe to wagons, which latter end is accomplished at a great disadvantage, for the reason that the wagons which bring the grain to the machine occupy the space where the elevator is situated, or in case the grain is taken from stacks the latter are in the way. The wagons to be loaded with the threshed grain from the machine must stand in such position that the dust, dirt, and chaff from the machine will not be blown upon the wagons and the grain contained therein. Hence the delivery-elevator must be hung so that it can be swung to different positions to suit the wind, &c. I obviate these disadvantages of the common style of threshing-machines by arranging the parts of my recleaner in a compact manner where they will not interfere with the feeding of the unthreshed grain to the machine or the delivery of the threshed grain from the machine, and the parts are simple in construction, efficient in operation, and so disposed that they deliver the different grades of the threshed grain to different chutes and enable the perfect grain to be sacked or delivered at the front of the machine, where it is not exposed to the dust, chaff, &c., blown from the hind end of the primary threshing-machine.

To the accomplishment of the ends herein specified my invention consists in the combination, with an elevator supported by the primary machine to receive the grain from the primary cleaning-shoe, of an inclined separator-screen supported on the top of the primary machine and extending longitudinally therefrom from the delivery end of the elevator to the cylinder-cap of the primary machine, a distributing mechanism arranged to receive the perfect grain from the delivery end of the separator-screen and to uniformly distribute and expose the perfect grain to the action of a moderate blast of air from a fan or blowers, which carries away all the refuse chaff and other obnoxious matter remaining in the separated grain after it has passed through the separator-screen, and a secondary shoe situated below the distributing and cleaning mechanism to receive therefrom and deliver the cleaned grain to the sacking devices or to the delivery-elevator. This longitudinal separator-screen is constructed in a novel manner with different sizes of screens to separate the timothy-seed and the weed-seed, the shriveled grain, and the cheat from the perfect kernels of grain, and to deliver the same into different chutes, while the unthreshed heads and white caps of the grain are carried over the end of the separator-screen and delivered back to the cylinder for the purpose of rethreshing the same; and the invention further consists in the novel combination of devices and in the construction and arrangement of parts, which will be hereinafter fully described, and particularly pointed out in the claims.

I have illustrated the preferred embodiment of my invention in the accompanying drawings, forming a part of this specification, and in which—

Figure 4:
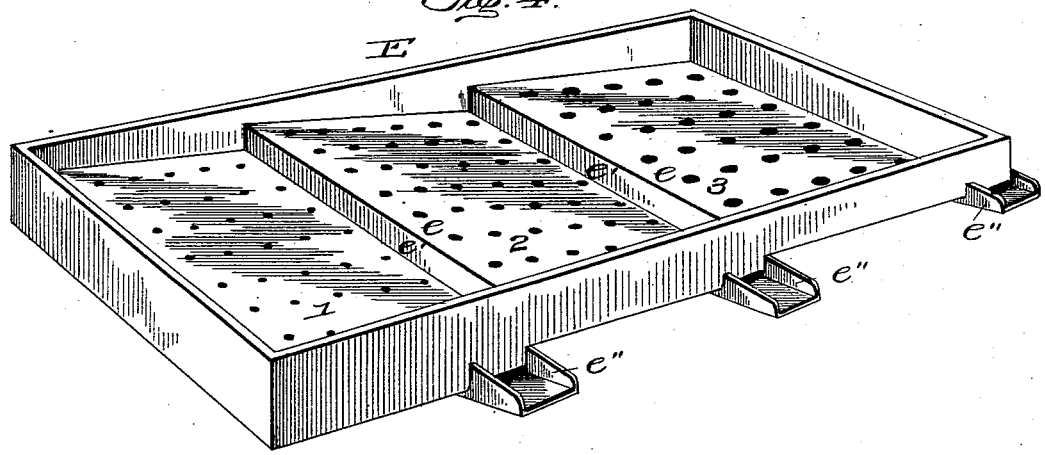
Figure 5:
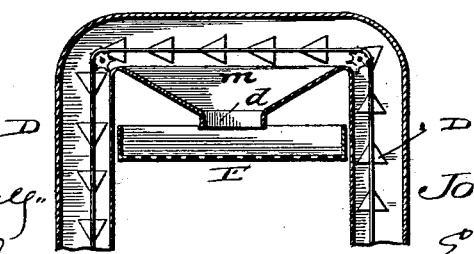

Figure 1 is a side elevation of so much of a threshing-machine as is necessary to an understanding of my improved recleaner, which is shown applied to the threshing-machine. Fig. 2 is a vertical longitudinal sectional view through the recleaner and the cylinder and concave of the threshing-machine. Fig. 3 is a top plan view of the recleaner, the elevator, and a portion of the threshing-machine; and Fig. 4 is a detail perspective view of the longitudinal shoe or screen of the recleaner. Fig. 5 is a view partly in section and illustrating the endless elevator by which grain is carried by the screen on top of the primary machine.

Like letters and numerals of reference denote corresponding parts in all the figures of the drawings, referring to which—

A designates a part of the casing of an ordinary threshing-machine, B the cylinder and concave thereof, C a part of the primary cleaning-shoe, and D is an endless elevator which passes around the machine to receive the threshed grain after it passes through the primary shoe C, all of which parts are of any preferred construction and form no part of the present invention.

My recleaner is arranged at the top side and front end of the primary threshing-machine, where it occupies a position out of the way of the wagons or stacks from which the grain is taken for feeding to the cylinder and concave B of the machine. My recleaner consists of the separator-screen E, the distributer concave and conveyer F G, the chute or spout H between the delivery end of the separator-screen and the distributing mechanism, a blast-fan I, and a secondary shoe J below the distributing mechanism and the blast-fan.

The separator-screen E is arranged in a horizontally-inclined position on the top of the primary machine A at the front part thereof, and the rear end of this screen is elevated somewhat above the front end of the screen, as shown by Figs. 1 and 2. This elevated rear end of the screen E lies just at the discharge-mouth $d$ of the elevator D, while the lower front end of said longitudinal inclined screen terminates at or over the cap $c$ of the cylinder and concave, into which the unthreshed heads and "white caps" of the grain deposited on the screen by the elevator are adapted to be discharged in order that they may again be passed through the cylinder and concave to be rethreshed. This screen consists of a frame which has its side bars provided with the recessed lower edges forming the offsets or shoulders $e$, and the frame is divided into panels or sections by means of the transverse bars $e'$, which are secured within the frame at suitable distances from each other. To the bars forming the frame are secured the screens 1 2 3, (see Figs. 2 and 4,) and these screens have perforations or meshes of different sizes adapted to accommodate the different grades of grain which are to be separated by the screen. Thus the first screen 1 has its perforations or meshes of such size as to permit the small timothy-seed to pass therethrough. The second screen 2 is of such size as to permit the shriveled grain, weed-seed, and cheat to pass through, and the last screen 3 is of such size as to permit the heavy particles of grain or kernels to pass through its meshes or perforations. Below the screens the frame E is provided with a series of imperforate grain-boards and with a series of spouts $e''$, the latter being situated at the discharge or lower parts of its screen and grain-board, and the boards being parallel with their respective screens, whereby the kernels of grain passing through the screens are caught by the boards and discharged to the spouts. These spouts extend or project from one side of the screen E, as shown by Fig. 4, and the spout from the screen 1 is arranged to discharge the timothy-seed into a receptacle (not shown) placed beneath it or into a vertical chute on one side of the machine A. The spout $e''$ from screen No. 2 delivers the shriveled grain, weed-seed, and cheat into a vertical chute or into a suitable receptacle placed below the spout of the screen 2, while the spout $e''$ from the screen No. 3 discharges into a flaring mouth $h$ of the inclined chute H, as shown by full lines in Fig. 1 and by dotted lines in Fig. 2.

The distributing mechanism F G is contained within the frame or casing A of the threshing-machine immediately in front of the cylinder and concave B, and this distributing mechanism is arranged transversely across the main machine. This mechanism consists of the concavo-convex trough-shaped receptacle F and the screw conveyer G, and said trough is suitably secured within the casing A, and is provided with perforations in its bottom, which perforations are of such size as to permit the large perfect kernels of grain to freely pass through the trough. The conveyer G is carried by a shaft which is suitably journaled within the casing A, and the conveyer is disposed close to the perforated bottom of the trough F, said shaft of the conveyer being driven by suitable gearing or connections with the cylinder-shaft or with any other operative part of the main machine.

The blast-fan I lies immediately in front of the distributing mechanism, and it is constructed to deliver a moderate blast of air to the distributing mechanism and to the secondary shoe J in order to blow away any chaff or other refuse that remains in the cleaned grain after its delivery from the separator-screen E. The fan-shaft may be geared or belted to the cylinder-shaft or other part of the machine, and the secondary shoe J, which is suspended by suitable links $j$ within the main casing A, is operated by a pitman $j'$, which is connected to the shoe and to a crank on the fan-shaft. (See Fig. 2.) This secondary shoe is preferably provided with a screen having fine or small perforations for the passage of dust or other refuse, and said shoe is inclined to deliver the recleaned grain to a spout $k$, (indicated in Fig. 1,) from which the bag may be suspended to receive and sack the recleaned grain, or a delivery-elevator may be arranged in any preferred way to receive from the secondary shoe of the recleaner in order to load the recleaned grain into wagons or other places.

The grain deposited into the chute H from the screen 3 of the separator E is discharged into a hopper H', (see Figs. 1 and 2,) which hopper is arranged at the lower discharge end of the inclined chute H and over the distributing mechanism, and the conveyer G carries the grain along the trough-shaped receptacle F and uniformly distributes the same, so that all the kernels will be subjected to the blast of air from the fan I.

This being the construction of my improved recleaner, the operation may be briefly described as follows: The grain from the primary shoe of the threshing-machine is carried by the upright elevator D and deposited on the inclined separator E. The timothy-seed passes through screen 1 and is discharged from the spout $e''$. The shriveled grain, weed-seed, and cheat are discharged from the spout of screen 2. The large heavy particles of the grain pass through screen 3 and are discharged by the spout thereof into the inclined chute H, while the unthreshed "heads" and white-caps pass over the lower end bar of the screen-frame and are discharged into the primary machine to be rethreshed. The grain deposited in the chute H is delivered to the hopper H' and thence to trough F, upon which the grain is evenly distributed by the conveyer G, and as the grain passes along the trough and through its perforations it is subjected to a moderate blast of air from the fan I. From the trough the grain is deposited upon the inclined shaking secondary shoe J, and from thence it passes to the sack or bag or to a delivery-elevator.

If desired, the shaking secondary shoe may be provided or constructed with two screens to separate the large and small perfect kernels of grain and discharge them separately into sacks or receptacles.

My improved recleaning mechanism is so disposed on the primary machine as to take up very little room, and it is out of the way of the wagon or stack from which the grain is taken to be fed to the primary machine, and said recleaner operates efficiently to separate the different grades of seed and discharge them separately as well as to thoroughly clean the perfect grain from dust, chaff, and all refuse before final delivery of the perfect grain from the recleaner.

The primary separating-screen E of my recleaner, which is mounted longitudinally upon the top of the primary machine, is given a shaking motion by any suitable means—as, for instance, one end of the screen may be hung below the discharge-spout of the elevator D, as shown by Fig. 1—and to the screen is connected the cranks of the crank-shaft M, which is suitably journaled on the bearings supported by the frame of the primary machine A, one end of this crank-shaft being geared or belted to the shaft of the cylinder B, (see dotted lines in Fig. 1 and full lines of Fig. 2;) but this particular means for shaking the screen is not material, and can be varied or changed at pleasure.

In Fig. 5 of the drawings I have shown a detail view of the elevator which I prefer to employ. This elevator is preferably of the endless variety, and it is arranged to encompass or pass entirely around the primary machine. The endless elevator operates within a suitable housing on the sides and top of the primary machine and in the usual trough or receptacle provided for receiving the threshed grain from the shoe of said primary machine. The elevator may be of any preferred construction, with buckets which move along in the lower horizontal trough of the shoe receiving from the primary machine A, and as the buckets pass through said trough they are filled with the grain and carry the load up one side of the machine A, and as these buckets pass over the top of the primary machine they are turned to discharge the grain into the discharge-spout $m$ of the elevator-casing, which spout $m$ delivers the grain to the longitudinal separator-screen E.

Having thus fully described my invention, what I claim as new, and desire to secure by Letters Patent, is—

1. The combination with a primary threshing-machine, and the cylinder thereof, of a separator arranged longitudinally upon the top of the primary machine and carrying screens of different sizes, an elevator between said primary machine and the separator, a secondary shoe situated in advance of said cylinder, and in line with the elevated separator and the primary machine, a distributing mechanism interposed between said separator and the secondary shoe, and a blast-fan arranged in advance of the secondary shoe to deliver its blast upon said shoe toward the cylinder of the primary machine, substantially as and for the purposes described.

2. The combination with a primary machine, and the cylinder thereof, of an inclined separator mounted upon the top of the primary machine and carrying screens of different sizes and discharge-spouts from said screens, an elevator between said separator and the primary machine, a secondary shoe situated below the separator and in advance of the cylinder, a transverse distributing-trough and conveyer between the separator and secondary shoe, a chute which receives from the lower end of the separator and delivers to said transverse trough, and a blast-fan for the secondary shoe, substantially as and for the purposes described.

3. The combination with a primary threshing-machine and the cylinder thereof, of an inclined shaking-separator arranged longitudinally upon the top of the primary machine, and provided with a series of screens and with discharge-spouts for the screens, and an endless elevator which travels in the grain-trough of the primary threshing-machine and delivers the grain to the upper end of the inclined separator, a distributing mechanism above and in advance of the cylinder, a vertical spout on one side of the primary machine and having its upper end receiving from the lower screen of the separator and carried inward to discharge to the distributing-trough, a secondary shoe situated in advance of the cylinder and below the distributing-trough, and a blast-fan situated in front of the secondary shoe to deliver its blast upon the shoe and distributing mechanism, substantially as described.

4. The combination of a separator having the screens and the discharge-spouts which receive the different grades of grain separated by said screens, an inclined chute arranged below the final screen of the separator and discharging to a hopper, a concave perforated trough below said hopper, a screw conveyer operating within said trough, a shaking-shoe below the trough, and a blast-fan in advance of the trough and above the shoe, for the purposes described, substantially as set forth.

5. The combination with a threshing-machine, and an elevator, of an inclined separator arranged longitudinally of the machine to receive from the elevator and to discharge into the cylinder, and provided with a series of screens and with independent discharge means, a perforated trough and conveyer contained within the casing of said machine in front of the cylinder, an inclined chute arranged to receive from the final screen of the separator and having a lateral delivery to the trough and conveyer, a shaking-shoe below said trough and arranged at the front of the machine to deliver to a sacking or delivery mechanism, and a blast-fan in front of the trough and above said shoe, substantially as described.

In testimony whereof I affix my signature in presence of two witnesses.

JOHN P. MONNETT.

Witnesses:
ADELINE M. CHILCOTE,
HIRAM DAY.